Aug. 11, 1959    W. J. CROSHIER ET AL    2,898,686
DIAL INDICATOR GAGE
Filed Feb. 10, 1956    2 Sheets-Sheet 1
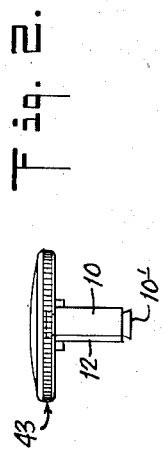
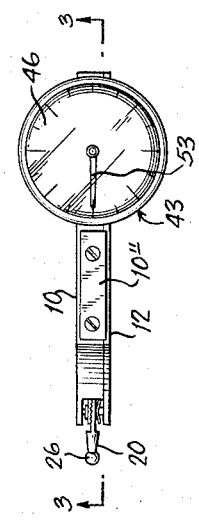
INVENTORS
WALTER J. CROSHIER
JOHN KLINK
BY
Darby & Darby
ATTORNEYS Aug. 11, 1959
W. J. CROSHIER ET AL
2,898,686
DIAL INDICATOR GAGE
Filed Feb. 10, 1956
2 Sheets-Sheet 2
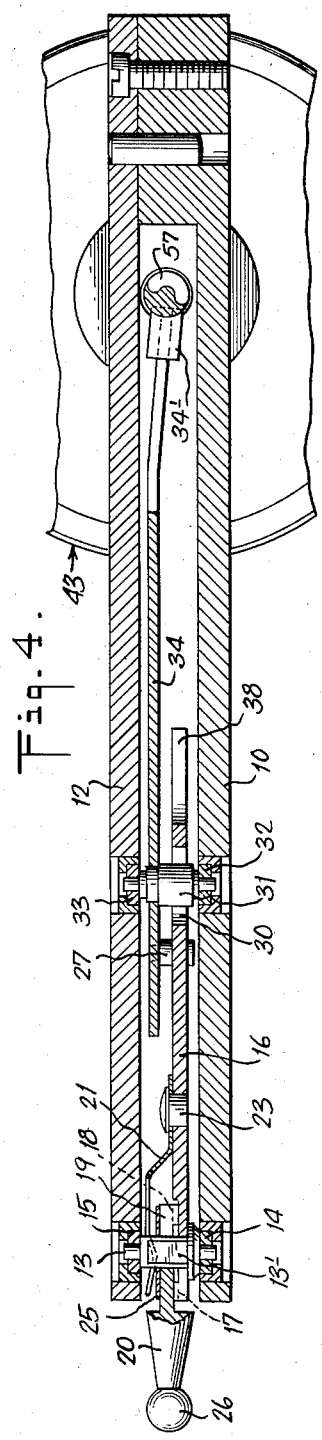
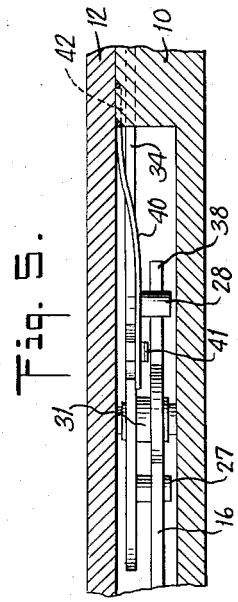
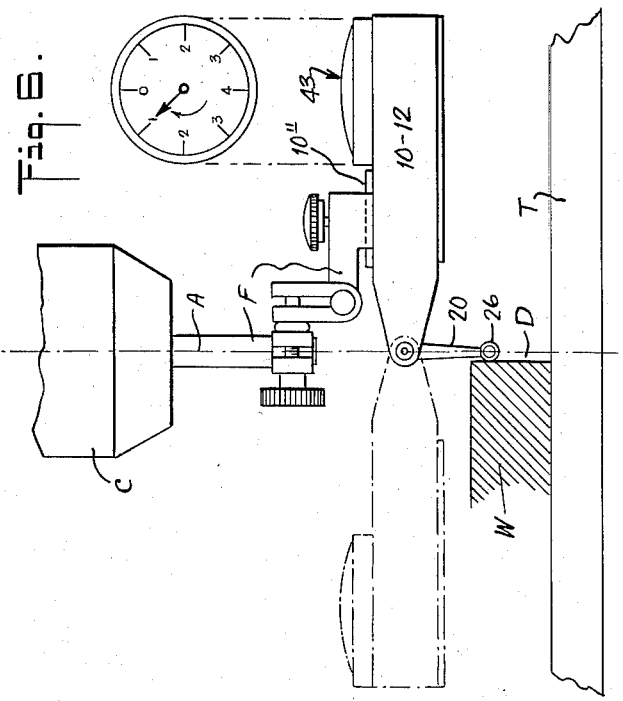
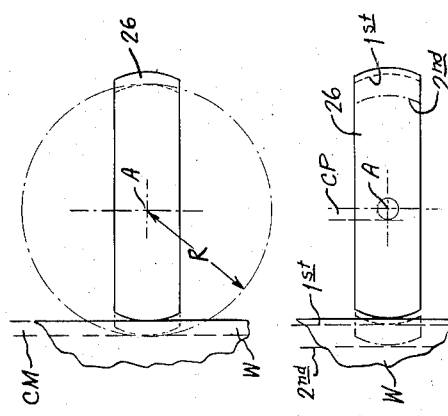
INVENTORS
WALTER J. CROSHIER
JOHN KLINK
BY
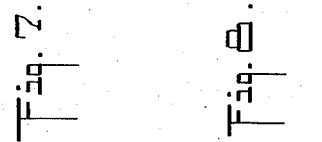
ATTORNEYS

United States Patent Office 2,898,686
Patented Aug. 11, 1959

2,898,686

DIAL INDICATOR GAGE

Walter J. Croshier, Hyde Park, and John Klink, Pine Plains, N.Y., assignors to Standard Gage Company, Inc., Poughkeepsie, N.Y., a corporation of New York Application February 10, 1956, Serial No. 564,823

2 Claims. (Cl. 33—172)

This invention relates to dial indicator gages of the type capable of accurately determining relatively small linear dimensions.

More particularly, the gage is of the dial indicator type commonly known as test indicators, which are usually of quite small dimensions and are convenient for use on machine tools for testing trueness of surfaces difficult of access, and by way of example only, suitable for use on a height gage for checking work surfaces with reference to a surface plate or for measuring accurately the difference between a work surface and the centerline of a tool spindle.

In accordance with this invention, one object is to provide a gage of this type in which movement of the work contacting member in either direction will actuate the gage pointer in the same direction.

Another object of this invention is to provide in a gage of this type an actuating lever combination in place of the more common longitudinally movable plunger type of actuated gage.

Still another object of the invention is to incorporate in a gage of this type a lever actuated system arranged so that angular displacement of one lever in the measuring operation, regardless of which direction it is moved, will cause another lever to have an angular displacement which is substantially the same for the same measured distance.

Many other and more detailed objects of the invention will be apparent from the following description of the embodiment thereof illustrated in the attached drawings, including various details of construction whereby friction is reduced at most of the points where friction would introduce error in the reading of the gage.

In the drawings,

Figure 1 is a top plan view of the complete instrument of this invention in approximate full size, indicating its utility for working individually or in groups in places difficult of access by gages available for similar measurements;

Figure 2 is an end elevational view of the gage of Figure 1 in the same scale;

Figure 3 is an enlarged view of the indicator in cross-section taken on the line 3—3 of Figure 1;

Figure 4 is a similarly enlarged cross-sectional view taken on the line 4—4 of Figure 3;

Figure 5 is a cross-sectional detail view taken on the line 5—5 of Figure 3;

Figure 6 is an elevational view showing the gage as used for measuring the distance between the centerline of a tool chuck and the face of a workpiece;

Figures 7 and 8 are diagrammatic views illustrating one use of the versatility of the gage of this invention.

The structure disclosed in the drawings will be described in detail. As shown the gage comprises a body member 10 having a cavity 11 therein and provided with a removable cover 12 which can be attached in place by machine screws as indicated in the drawings. Pivotally mounted on the end of the body 10 and cover 12, is a shaft 13. This shaft is supported at its lower end in bearing 14 and at its upper end in bearing 15. These bearings are constructed as shown to provide free rotation of shaft 13 while taking up any end thrust of this shaft.

As illustrated in Figure 4, shaft 13 is provided with a pair of diametrically opposed flats 13'. Fixed to the shaft 13 is a primary lever 16, which lever is provided with radial serrations 17, positionally surrounding the shaft 13. A work contact member 20 is provided with a circular end 19 having a central passage through which the shaft 13 extends, which passage is open in a radial direction centrally of the member to a width so that it can slide into the position shown in Figure 4 about the shaft 13 when that shaft is arranged with its flats 13' to pass through the radial opening. The end face of the circular end 19 is provided with mating radial serrations 18, dimensioned to mesh with the serrations 17. The member 20 is rotatable with respect to lever 16, so that it can lie along the axis thereof or take various angular positions on either side of that axis. The serrations 17 and 18 are held engaged by means of a flat spring 21 which is anchored at one end to the lever 16 by means of a rivet 23.

As shown in Figure 3, the free end of the spring 21 is bifurcated, as shown at 24, so that it can fit around the shaft 13 and bear upon a washer 25 which rests on the upper surface of the end 19 of the member 20. The slot which bifurcates the end 24 of the spring is enlarged along curved lines, as shown in Figure 3, so as to fit around the maximum dimension of the shaft without contacting it. This slot tends to equalize the pressure of the spring on opposite sides of the assembly. The free end of the contact member 20 is provided with a gaging ball end 26 Figures 1 and 3 as best indicated in Figures 6, 7 and 8 may have a pair of diametrically opposed flats ground on the surface thereof.

It will be seen that the work contact member 20 has an adjustable connection with the end of the primary lever 16, which is adequately maintained in normal use by means of the spring loading provided by the spring 21. However, the member 20 can be given various angular positions on either side of the longitudinal centerline of lever 16 by pressing on its free end to disengage the serrations 17 and 18, against the resistance of spring 21, whereupon it may be moved in either direction with respect to lever 16. When it is released it will drop back into position under the pressure of spring 21 and the serrations 17 and 18 will reengage to releasably lock the contact member in adjusted position. With this construction the contact member can be swung through a maximum union of about 180° and yet is firmly held in position for all normal working pressures.

The control member 20—26 can be removed or replaced by contact members of other lengths by centrally positioning it and tipping it upwardly to disengage the serrations. It is then pulled to pass the flats 13' to pass through the slot in its end 19.

A secondary lever 34 cooperates with the primary lever and is fixed to a shaft 31 which is journaled in the bearings 32 and 33, see Figure 4. Secured to the lever 34 on the side facing lever 16, are a pair of pins 27 and 28. These pins are arranged to engage camming surfaces 36 and 38 on the lever 16. Camming surface 36 is provided at the base of a notch 37 on one side of the lever and camming surface 38 is provided at the edge of the extension 35 of the lever 16. As clearly shown in Figures 3 and 4, lever 16 is provided with a clearance aperture 30 surrounding the shaft 31, so that within the limits of the movement of lever 16, shaft 31 will not interfere with them. As is indicated in Figure 3, the camming surfaces 36 and 38 are both on the longitudinal center line of lever 16 and the pins 27 and 28 are arranged on opposite sides thereof so that when the gage is at rest the free end of lever 34 will be out of contact with the casing, as clearly shown in Figure 3.

A cantilever spring 40 engages an integral tab 41 formed on the lever 34 at a point between the fulcrum of that lever and the outer driving pin 28. This arrangement tends to keep the fulcrum bearing pressure on the same side regardless of which of the driving pins 27 and 28 is operating the secondary lever 34. This insures greater accuracy of operation.

As shown in Figure 3, the spring 40 has line contact with the tab 41 in all working positions so that the spring does not engage the tab along a flat surface. By avoiding a flat contact between the spring 40 and tab 41, the resulting force will have a smoother gradient rather than a stepped gradient as would be the case with the spring rocking across a flat. Spring 40 is anchored at its other end in a semicircular groove 42, see Figure 3, milled in the housing 10, and the edges of the groove are swaged over to fix this end of the spring in the housing.

The arrangement of the primary and secondary levers, the pins and the camming surfaces when both of these pins 27 and 28 engage their respective camming surfaces 36 and 38 under the pressure of spring 40, the free end of lever 34 as previously mentioned does not engage the casing 10. This is the position of rest for the instrument. With this construction any possible backlash is avoided so that when the work contact member 20—26 begins to move from rest position the response of the indicator will be immediate.

Reference will now be made to a very important feature of this invention, it being first noted that the pins 27 and 28 are positioned at different distances from the center of shaft 31, these distances being proportioned with respect to the acting length of lever 16, so as to cause normal movement of the lever 34, regardless of which of the driving pins 27 and 28 is actuating it.

As will be clear from Figure 3, when the lever 16 moves in a clockwise direction, camming surface 38 bears against the pin 28 and causes the righthand end of lever 34 to move downwardly. On the other hand, when lever 16 is rotated in a counterclockwise direction, camming surface 36 bears against the pin 27, also causing the righthand end of lever 34 to move downwardly. For emphasis it is noted that the parts are so proportioned that the same angular movement of primary lever 16, regardless of its direction, will cause the same downward movement in the same amount of the free end of lever 34.

Fixed to the housing 10 is the dial indicating unit 43 comprising the graduated dial 44, a bezel ring 45, a crystal 46, a dial plate 47 and a dial retaining spring 48. A shaft 52 to the upper end of which is attached the indicating pointer 53 is journaled at its upper end in a bearing 50 and at its lower end in a jeweled thrust bearing 51. The housing 10 is provided with a concentric chamber in which a cap 55 is firmly anchored. Positioned within the cap 55 is a hairspring 54, the inner end of which is anchored to the shaft 52. The other end of this spring extends into a radial hole in the side wall of the cap 55 and is anchored therein by means of a pin 60 which lies in an axial hole in the wall of the cap and intersects the radial hole. This pin firmly anchors the end of the hairspring in the cap wall.

Shaft 52 is provided with a helically cut and lapped surface which is open at both ends, as shown in Figure 3. The terminal end of lever 34 is provided with a plastic, as for example nylon, contact piece 34', which may, as shown, in Figures 3 and 4, be a sleeve, which bears against the helical surface 57. Thus, as lever 34 moves downwardly it causes a clockwise rotation of the shaft 52 as viewed in Figures 1 and 6, the movement in this direction being opposed both by the main spring 40 and the hairspring 54. The helix or helicoid track 57 is formed by a grinding and lapping process, the line of lapping being in the direction of the sliding action of the lever 34. The helical surface 57 being open at both ends facilitates the grinding and lapping operation by continuous rotation of the shaft 52. In some cases the helical surface 57 can be concave in a radial direction providing edge engagement with the contact piece 34' to reduce friction at this point.

Due to the construction disclosed and the fact that the dial plate rests on the surface of the housing 10 and the cover 12, the dial plate and bezel assembly together with the dial proper may be readily interchanged so that larger or smaller dial assemblies may be utilized as conditions dictate.

There are small inherent errors of amplification in the lever system described, but this can be readily compensated by slight modifications in the shape of lever 34 or by slight changes in the position of the driving pins 27 and 28. However, the theoretical inherent errors mentioned are so small as to be unimportant in practice, and therefore, it is not necessary to make such changes, but rather merely necessary to so construct the lever 34 and so locate the driving pins 27 and 28 that the contact between the pins and camming surfaces is on the longitudinal center line of lever 16 and the distance from the shaft 13 of these pins is proportional to the effective length of lever 34.

Another slight error exists because of the fact that the end of lever 34 moves in an arcuate path along the helix. This error cannot readily be directly compensated. However, it is a positive error over part of the range and a negative error over the remainder. As a result the maximum deviation from correct calibration with a zero reference at one end of the range amounts to about one graduation on the dial, and since there are 80 dial graduations in one practical form of the device, the error in each graduation is insignificant.

It is also to be noted that the downward pressure of lever 34 on the helical surface does not create any serious frictional thrust error because of the jeweled thrust bearing 51 which supports the shaft.

It should be noted that very little frictional loss is encountered at the contact point between the nylon sleeve 34' and the helical surface 57, because of the low coefficient of friction between them, especially if the helical surface is a polished chrome plating. If the parts are constructed so that the nylon sleeve engages only the edge of the helical surface, the contact point will be at a maximum distance from the axis of shaft 52, with the result that the helix angle is less. This tends to increase the friction at this point, which is reduced by using nylon against a polished chrome surface.

It is also to be noted that contact members 20—26 of different lengths and different ball ends may be used. For example, if the member 20—26 is twice normal length and a special dial having twice the range is provided, there results a fifty percent reduction in mechanical amplification and movement. This provides a gage particularly useful for checking work in a jig borer, where it is desired to keep the dial horizontal while rotating the machine spindle. Such an arrangement is illustrated in Figure 6, where the tool chuck of the borer is diagrammatically shown at C, having a center line of rotation at A. The gage may be mounted in the chuck by means of a universal fixture F, which attaches to the dovetail mounting plate 10" attached to the casing 10. At this point it may be noted that a similar dovetail shaped mounting plate 10' is attached to the bottom of the casing 10, so that the gage for some uses can be supported from that side.

The table of the borer is shown at T and mounted on it for explanatory purposes there is diagrammatically illustrated a workpiece W. The problem is to determine the distance D between one face of the workpiece W and the center line A of the chuck. This is known as "edge finding." In this problem it happens that the center of the contact ball 26 is shown on the center line A. Let us further assume that the radius of the contact ball 26 is 0.054". It is to be further understood that the pointer 53 of the gage has a rest position on graduation No. 4, so that as shown the pointer has moved three dimensions to position 1. The indicator dial as shown in Figure 6, has markings of 0–4–0 each numbered graduation representing 0.001", the usual subdivision not being shown.

In bringing the instrument to the position described, the indicator hand has moved, as stated above, from graduation No. 4 to graduation No. 1, which according to the formula $D=R$ minus indicator movement, establishes that D in this case is .051". It is also to be noted under these conditions that rotation of the gage on the center line A to the dotted position shown in Figure 6, will give the same reading on the dial. This is true because the ball 26 is deflected the same distance with respect to the axis A. The actual movement of the contact ball 26 is indicated in Figure 7 at CM and represents a distance of 0.003" for a dial reading of 1, which results from the indicator hand moving from rest position 4 to graduation 1. All this is diagrammatically illustrated in Figure 7. However, if this rotation of the gage through 180° shows a different reading from the full line position reading, it means that the center of the contact ball is not on the axis A, when the gage is at rest.

This latter condition represents the problem illustrated in Figure 8. With regard to the problem illustrated in Figure 8, it is clear that the center of the contact ball is not on the axis A. As will appear, in the assumed case the center is 0.002" to the left thereof. This is represented by the distance CP in Figure 8. For the full line position of the gage, Figure 6, the indicator hand of the gage will be at graduation 3, the contact ball 26 moving to the full line position of Figure 8 from the dotted rest position indicated at 1st. When the gage is rotated 180°, Figure 6, the indicator hand will be at graduation 1, the contact ball 26 moving to the same full line position but in this case from the dotted rest position indicated at 2nd, Figure 8. The corresponding displacements of the contact ball 26 are 0.005" and 0.001". The formula for this problem is $D=R$ minus the mean of these two distances. Thus the mean of the deflections. Thus the distance D being sought is 0.054" minus 0.003" or 0.051". It is noted that the small circle having a center at A in Figure 8, indicates the path of rotation of the center of the ball 26, as the gage is swung around from full line position to dotted position, as illustrated in Figure 6.

It is noted that the sides of the spherical contact piece 26 were ground off so as to clear the work as the gage is rotated through an angle of 180°, as described.

An important feature of the structure herein disclosed is its capability of operating at much lower contact pressures than similar indicators of other constructions of comparable size. A widely used commercial form of this device requires a pressure of 30 grams at zero position to rotate the indicator hand in a clockwise direction. This device requires a switching device to reverse its operation and when switched the operating pressure from zero position is 20 grams. With the device herein disclosed, requiring no switching mechanism, the operating pressure is the same for either movement of the contact arm and is lower than the operating pressure for either direction of application for the structure referred to above. The contact pressure of the device herein disclosed can be dropped still lower, for example below 10 grams by using a longer contact member. It is believed that the construction herein disclosed requires the least operating force of any indicator of this type, and most importantly, this force is the same for either direction of the contact member.

From the above description it will be apparent to those skilled in the art that the subject matter of this invention is capable of variations in detail without departure from the novelty thereof. We prefer, therefore, to be limited by the claims rather than by the illustrated example herein described.

What is claimed is:

1. In a dial indicator gage, in combination, a casing, a first lever pivotally mounted in said casing, a work contact member forming one arm of said lever and extending outside said casing, a pair of camming surfaces on said lever at the end opposite said member, said surfaces being spaced apart longitudinally and lying on the longitudinal center line of said lever, a second lever pivotally mounted in said casing, said pivotal mounting being on the longitudinal center line of said first lever and between said camming surfaces, a pair of pins on said second lever engaging said camming surfaces, a helicoid shaft journaled in said casing, the end of said second lever bearing against the helicoid surface of said shaft to thereby rotate said shaft as said second lever moves under drive of said first lever and a spring fixed to said casing and bearing against said second lever at a point between the pivotal mounting thereof and the driving pin most remote from the pivotal mounting of said first lever, said spring holding said lever in a rest position.

2. A dial indicator gage as claimed in claim 1, wherein said spring is fixed to said casing at one end thereof, said spring having a loop formed thereon, said loop extending into a segment of a circular groove in said casing wall, said circular segment being pressed against said loop to hold it in a fixed position.

References Cited in the file of this patent

UNITED STATES PATENTS

| | | |
|---|---|---|
| 1,466,664 | Lowe | Sept. 4, 1923 |
| 1,678,388 | Holden | July 24, 1928 |
| 2,267,583 | Carroll | Dec. 23, 1941 |
| 2,541,790 | Sugden et al. | Feb. 13, 1951 |
| 2,621,413 | Welch | Dec. 16, 1952 |
| 2,650,036 | Berkepeis | Aug. 25, 1953 |

FOREIGN PATENTS

| | | |
|---|---|---|
| 566,199 | Great Britain | Sept. 23, 1943 |